US005399864A

United States Patent [19]

Igarashi et al.

[11] Patent Number: 5,399,864

[45] Date of Patent: Mar. 21, 1995

[54] IONIZATION TYPE SMOKE DETECTOR

[75] Inventors: Yoshinori Igarashi; Toru Sasaki; Ichirou Kobayashi; Ikuhisa Hatakenaka; Kentaro Higashi; Nobuo Hatori; Makoto Kamihigoshi; Kazuyuki Koganemaru, all of Tokyo, Japan

[73] Assignee: Nohmi Bosai Ltd., Tokyo, Japan

[21] Appl. No.: 51,300

[22] Filed: Apr. 23, 1993

[30] Foreign Application Priority Data

Apr. 25, 1992 [JP] Japan .................................. 4-131539

[51] Int. Cl.[6] ..................... G01T 1/185; G08B 17/113

[52] U.S. Cl. .................................. 250/381; 250/384; 250/385.1

[58] Field of Search ...................... 250/381, 384, 385.1

[56] References Cited

U.S. PATENT DOCUMENTS

| | | | |
|---|---|---|---|
| 3,767,917 | 10/1973 | Lampart et al. . | |
| 4,383,253 | 5/1983 | Lam et al. | 250/381 |
| 4,396,840 | 8/1983 | Araki et al. | 250/381 |
| 4,584,485 | 4/1988 | Powers et al. | 250/574 |
| 4,672,217 | 6/1987 | Dobrzanski | 250/574 |
| 4,761,557 | 8/1988 | Sasaki et al. | 250/381 |
| 4,786,811 | 11/1988 | Sasaki | 250/385.1 |
| 4,897,634 | 1/1990 | Sawa et al. | 250/574 |
| 5,160,916 | 11/1992 | Ishii et al. | 250/385.1 |

FOREIGN PATENT DOCUMENTS

| | | |
|---|---|---|
| 0217100 | 4/1987 | European Pat. Off. . |
| 2544616 | 10/1984 | France . |
| 2740521 | 3/1979 | Germany . |
| 3037869 | 10/1981 | Germany . |

OTHER PUBLICATIONS

Patent Abstracts of Japan, vol. 13, No. 329 (P-904) Jul. 25, 1989.

*Primary Examiner*—Carolyn E. Fields
*Attorney, Agent, or Firm*—Wenderoth, Lind & Ponack

[57] ABSTRACT

An ionization type smoke detector includes a detector body, a printed circuit board on the upper surface of the detector body, an electrode mount on the upper surface of the printed circuit board, an inner electrode securing the electrode mount onto the printed circuit board and which has a radioactive source, an intermediate electrode screwed onto the electrode mount in such a way as to be situated above the inner electrode, and an outer electrode covering the electrode mount, the inner electrode and the intermediate electrode. The outer electrode has a plurality of smoke inlet windows, and is fixed to the upper surface of the printed circuit board by inserting engagement members at the lower end thereof into insertion holes of the printed circuit board. The electrode mount has an FET accommodating section including a first socket, whereas a second socket is formed on the printed circuit board. Electrodes of an FET are connected to the sockets, respectively. The detector also includes a wind shield ring surrounding the outer electrode and fixed to the upper surface of the printed circuit board by hooks extending into second insertion holes of the printed circuit board. Further, a bug screen is interposed between the outer electrode and the wind shield. A shield case abuts the lower surface of the printed circuit board and is fixed to the lower surface thereof and electrically connected to the outer electrode. A protective cover covers these components and has smoke inlet windows.

32 Claims, 11 Drawing Sheets

IONIZATION TYPE SMOKE DETECTOR

BACKGROUND OF THE INVENTION

1. Field of the Invention

This invention relates to an ionization type smoke detector.

2. Description of the Related Art

A conventional ionization type smoke detector is disclosed, for example, in Japanese Patent Laid-Open No. 1-93895, according to which a printed circuit board is provided on a detector body through the intermediary of a shield case, and an electrode mount is provided on this printed circuit board. An inner electrode having a radiation source is attached to the electrode mount and, an intermediate electrode is secured in position above the inner electrode and is covered with an outer electrode. The printed circuit board and the outer electrode are encased in a protective cover composed of a wind shield cover, a bug screen and a cap.

Such a conventional ionization type smoke detector uses so many fixing screws that its assembling/disassembling are troublesome and time consuming.

Further, the head section of the inner electrode has a disc-like configuration, which makes the inner electrode rather difficult to handle, so that it takes a long time to secure the inner electrode in position. In order to ensure the designed performance of a detector, it is required that the electrode mount be fixed at a predetermined position on the printed circuit board. Nevertheless, it is difficult to achieve the accurate positioning with the conventional detector in which a misalignment between them is likely to occur.

In some cases, an FET is employed in a part of the electric circuit formed on the printed circuit board, which FET is electrically connected to the intermediate electrode. Conventionally, however, this FET is secured in position by soldering electrodes on both sides thereof, so that the mounting and replacement of the FET is time consuming and yet there is the fear that the FET might be damaged by heat. Further, since the FET is exposed on the printed circuit board, its inter-electrode section is subject to contamination by dust or the like, leading to reduction in insulation. Moreover, to electrically connect the electrodes of the FET mounted on the printed circuit board to the intermediate electrode, one end of a conductive member is screwed onto the intermediate electrode and the other end thereof is soldered onto the wiring pattern of the printed circuit board, or the intermediate electrode and the printed circuit board are connected to each other through the intermediary of the electrode mount by using conductive screws. Therefore, the electrical connection work is complicated and time consuming.

Further, the outer electrode is liable to move while it is being soldered on the printed circuit board, thereby making it difficult to secure it at the correct position. In addition, the outer electrode and the shield case are electrically connected indirectly to each other via the printed circuit board, which is time consuming.

When the speed at which air flows into the outer ionization chamber is excessively high, it is difficult to perform accurate smoke detection. Further, when any dust contained in the airflow adheres to a circuit part of the printed circuit board, a reduction in insulation may occur. In view of this, a structure has been devised in which the outer electrode is surrounded by a wind shield ring. However, the attaching of the wind shield ring to and the detaching of the same from the printed circuit board are time consuming. Further, the wind shield ring may be loosely positioned inside the detector.

SUMMARY OF THE INVENTION

An object of this invention is to provide an ionization type smoke detector which eliminates the above problems in the prior art and which can be assembled and disassembled easily.

Another object of this invention is to provide an ionization type smoke detector in which the fixing of the inner electrode and the accurate positioning of the electrode mount on the printed circuit board can be easily performed.

Still another object of this invention is to provide an ionization type smoke detector in which the connection between the FET and the intermediate electrode can be effected easily and in which the FET is protected from damage and contamination.

A further object of this invention is to provide an ionization type smoke detector in which the outer electrode can be easily secured at the correct position and in which the electrical connection between the outer electrode and the shield case is ensured.

A still further object of this invention is to provide an ionization type smoke detector which allows the wind shield ring to be easily attached and detached, which enables precise smoke detection to be performed, and which prevents the inside of the detector from being contaminated by dust in the air flow. According to a first aspect of the present invention, there is provided an ionization type smoke detector comprising:

- a detector body;
- a printed circuit board which is arranged on an upper surface of the detector body and which has first, second and third insertion holes;
- conductive connection metal members arranged on a lower surface of the detector body;
- terminal screws for simultaneously attaching the printed circuit board and the conductive connection metal members to the detector body;
- an electrode mount arranged on an upper surface of the printed circuit board;
- an inner electrode which secures the electrode mount onto the printed circuit board and which has a radioactive source;
- an intermediate electrode which is screwed onto the electrode mount in such a way as to be situated above the inner electrode;
- an outer electrode which covers the electrode mount, the inner electrode and the intermediate electrode, which has a plurality of smoke inlet windows, and which is fastened to the upper surface of the printed circuit board by inserting engagement members formed at the lower end thereof into the first insertion holes of the printed circuit board;
- a wind shield ring which surrounds the outer electrode, which controls the speed at which air flows into the smoke inlet windows, and which is fastened to the upper surface of the printed circuit board by inserting hooks formed at the lower end thereof into the second insertion holes of the printed circuit board;
- a bug screen placed between the outer electrode and the wind shield ring;

a shield case which abuts against a lower surface of the printed circuit board and which is fastened to the lower surface of the printed circuit board and electrically connected to the outer electrode by inserting engagement sections formed at the upper end thereof into the third insertion holes of the printed circuit board; and a protective cover which covers the printed circuit board, the outer electrode and the wind shield ring, which has a plurality of smoke inlet windows, and which is fastened to the upper surface of the detector body by engaging hooks formed at the lower end thereof with the detector body.

According to a second aspect this invention, there is provided an ionization type smoke detector comprising:

an electrode mount which has on its upper surface an inner electrode accommodating section having an insertion hole at the center thereof, the electrode mount further having on its lower surface a plurality of protrusions for temporary fastening;

an intermediate electrode fastened to the upper section of the electrode mount and having at its center a radiation transmission hole;

a printed circuit board having a first insertion hole formed at a position corresponding to the insertion hole of the electrode mount and a plurality of second insertion holes through which the plurality of protrusions of the electrode mount are inserted;

an inner electrode having a polygonal radioactive-source installing section and a leg section joined to the radioactive-source installing section and having a screw section formed on its free end portion, the radioactive-source installing section being accommodated in the inner electrode accommodating section of the electrode mount, with a radioactive source placed on its upper surface, the leg section being passed through the insertion hole of the electrode mount and the first insertion hole of the printed circuit board to be threadedly fastened on the lower surface of the printed circuit board; and an outer electrode which covers the electrode mount, the inner electrode, and the intermediate electrode and which is fastened to the printed circuit board.

According to a third aspect this invention, there is provided an ionization type smoke detector comprising:

a printed circuit board;

an electrode mount arranged on the printed circuit board and having an FET accommodating section for accommodating an FET;

an inner electrode which is attached to the electrode mount and to which a radioactive source is fastened;

an intermediate electrode fastened to an upper section of the electrode mount;

an outer electrode which covers the electrode mount, the inner electrode and the intermediate electrode and which is fastened to the printed circuit board;

a first socket formed in the FET accommodating section of the electrode mount and electrically connected to the intermediate electrode;

a second socket formed on the printed circuit board; and an FET which is accommodated in the FET accommodating section of the electrode mount and whose electrodes formed at its ends are respectively connected to the first and second sockets.

According to a fourth aspect this invention, there is provided an ionization type smoke indicator comprising:

a printed circuit board having a printed circuit formed on a lower surface thereof and a plurality of first insertion holes;

an electrode mount arranged on an upper surface of the printed circuit board;

an inner electrode which is mounted on the electrode mount and to which a radioactive source is fastened;

an intermediate electrode fastened to an upper section of the electrode mount; and an outer electrode which is fastened to the upper surface of the printed circuit board in such a way as to cover the electrode mount, the inner electrode and the intermediate electrode and which has a plurality of smoke inlet windows formed in a side wall thereof, the outer electrode having a plurality of engagement sections which are formed at its lower end abutting on the printed circuit board and which are inserted through the first insertion holes of the printed circuit board to be soldered to the printed circuit on the lower surface of the printed circuit board.

According to a fifth aspect this invention, there is provided an ionization type smoke detector comprising:

a printed circuit board in which a plurality of first insertion holes are formed;

an electrode mount arranged on an upper surface of the printed circuit board;

an inner electrode which is attached to the electrode mount and to which a radioactive source is fastened;

an intermediate electrode fastened to an upper section of the electrode mount;

an outer electrode which is fastened to the upper surface of the printed circuit board in such a way as to cover the electrode mount, the inner electrode and the intermediate electrode and which has a plurality of smoke inlet windows formed in a side wall thereof; and a wind shield ring which surrounds the outer electrode, which has a speed reduction mechanism for airflow through the smoke inlet windows of the outer electrode, and which is fastened to the upper surface of the printed circuit board by inserting hooks formed at the lower end thereof through the first insertion holes of the printed circuit board.

DETAILED DESCRIPTION OF THE PREFERRED EMBODIMENT

Figure 1:
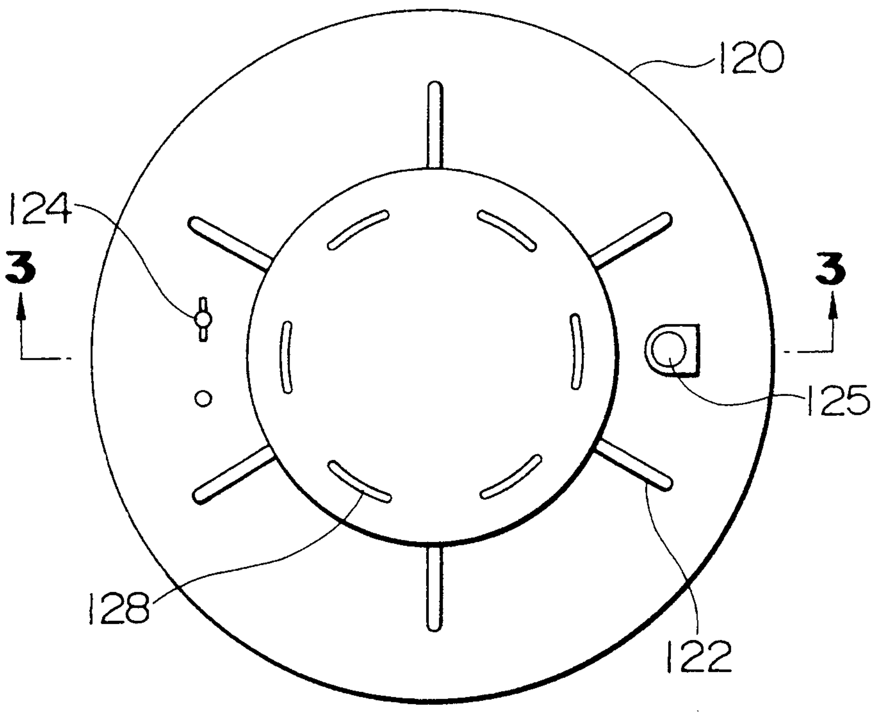
FIGS. 1 and 2 are a plan view and a bottom view, respectively, of one embodiment of an ionization type smoke detector according to the present invention.
Figure 2:
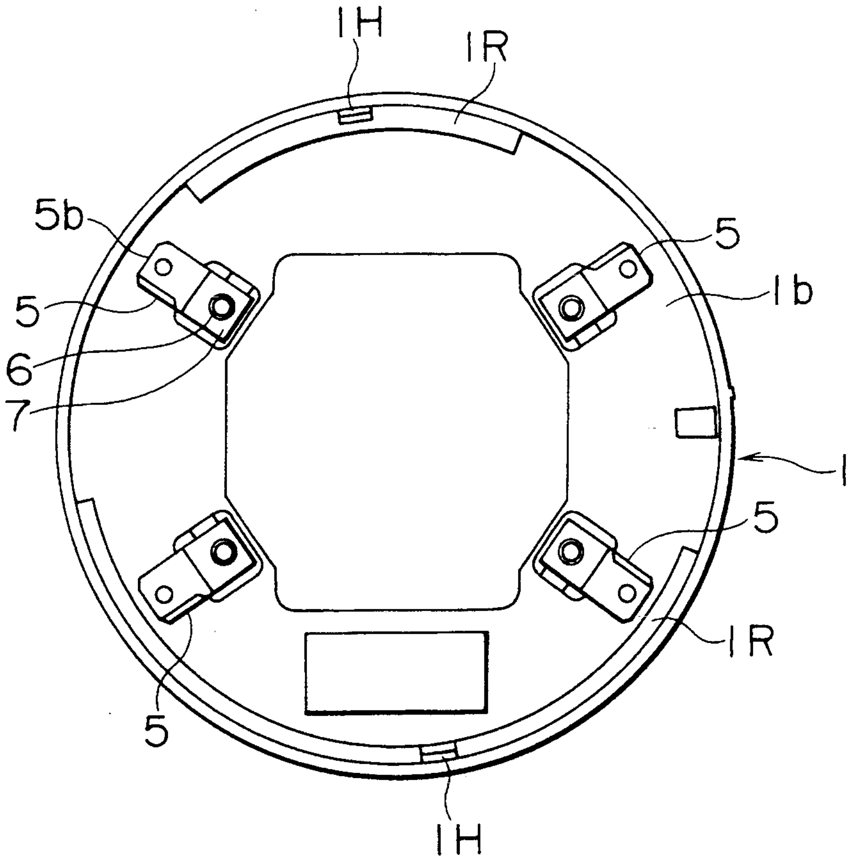
Figure 3:
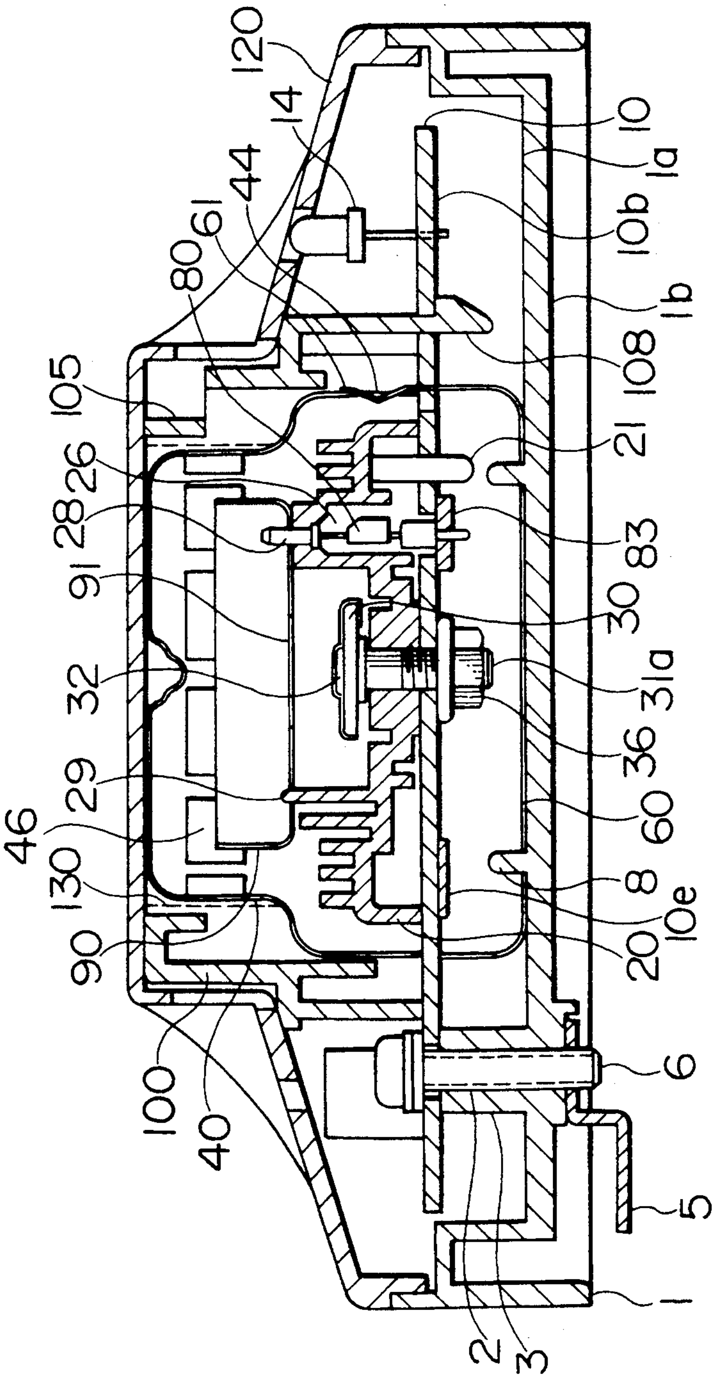
FIG. 3 is a sectional view of the smoke detector taken along a line 3—3 of FIG. 1.

An embodiment of this invention will be described with reference to the accompanying drawings. As shown in FIGS. 1 and 2, an ionization type smoke detector according to the present invention includes a detector body 1 and a protective cover 120 covering the upper section of the detector body 1. As shown in FIG. 3, a plurality of blade metal members 5 serving as conductive joint members are attached to a lower surface 1*b* of the detector body 1, and a shield case 60 and a printed circuit board 10 are mounted on an upper surface 1*a* of the detector body 1. The blade metal members 5 and the printed circuit board 10 are fastened to the detector body 1 by common terminal screws 6. An electrode mount 20, an inner electrode 30 and an indicator lamp 14 are mounted on an upper surface 10*a* of the printed circuit board 10. An intermediate electrode 90 is attached to the top section of the electrode mount 20, and an outer electrode 40 is provided on the upper surface 10*a* of the printed circuit board 10 in such a way as to encase the inner electrode 30 and the intermediate electrode 90. A bug screen 130 is arranged in such a way as to surround the outer periphery of the outer electrode 40. Further, a wind shield ring 100 is provided on the printed circuit board 10 in such a way as to surround the outer electrode 40 and the bug screen 130.

Figure 4:
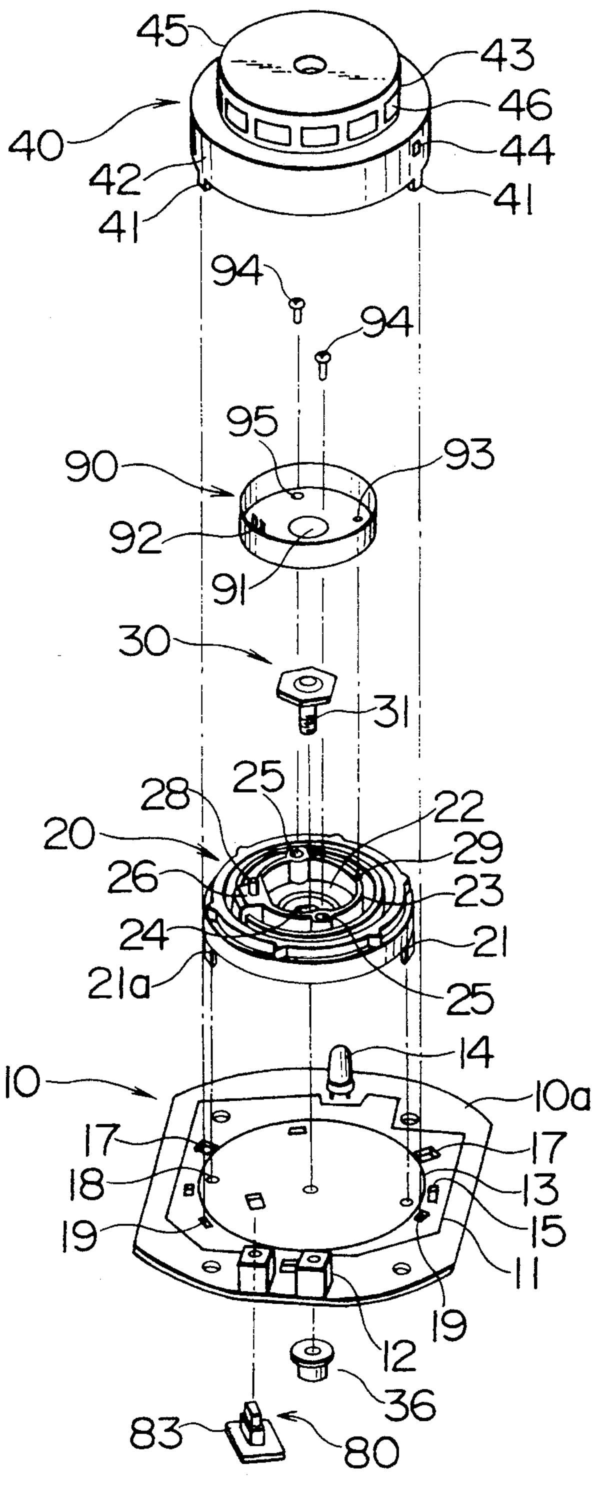
FIG. 4 is an exploded view of the smoke detector showing the printed circuit board, electrode mount, inner electrode, intermediate electrode, outer electrode, etc. thereof.

The ionization type smoke detector of this embodiment is assembled in the following manner: as shown in FIG. 4, the electrode mount 20, the inner electrode 30, the intermediate electrode 90 and the outer electrode 40 are mounted on the printed circuit board 10.

Provided on the upper surface 10*a* of the printed circuit board 10 are a shield section 11, check terminals 12, a radioactive-source-mount installing section 13, and the indicator lamp 14. Further, as shown in FIG. 3, a surface-mounting-type electric circuit part 10*e* is provided on a lower surface 10*b* of the printed circuit board 10. In addition, the printed circuit board 10 has insertion holes 17 through which hooks 108 of the wind shield ring 100 are inserted. Further, formed in the printed circuit board 10 are insertion holes 18 for protrusions 21, 21*a* formed on the electrode mount 20, insertion holes 19 for protrusions 41 provided on the outer electrode 40, and insertion holes 15 for engagement sections 61 of the shield case 60. When forming the check terminals 12, the wiring pattern of the printed circuit board 10 may be utilized.

A plurality of cylindrical walls 23 are provided around an inner electrode accommodating section 22 of the electrode mount 20. The inner electrode accommodating section 22 has an insertion hole 24 for a leg 31 of the inner electrode 30. Provided in the periphery of the cylindrical walls 23 are intermediate electrode mounting holes 25 and an FET accommodating section 26, which are circumferentially spaced from each other. The lower end of the FET accommodating section 26 is formed as an open end section. A connection terminal 28 is provided on the upper surface of the FET accommodating section 26. The connection terminal 28 has a sack-like configuration, which is a first socket into which a gate electrode 81 of an FET 80 can be inserted. Provided on the outer peripheral walls of the electrode mount 20 are the plurality of protrusions 21, 21*a* to be fitted into the insertion holes 18 of the printed circuit board 10, which protrusions are circumferentially spaced apart from each other.

The intermediate electrode 90 has at the center of its bottom surface a radiation transmission hole 91. Further, formed in the periphery of the intermediate electrode 90 is a spring hole 92 into which the connecting terminal 28 is fitted, an insertion hole 93 for a positioning protrusion 29 of the electrode mount 20, and holes 95 which allow screws 94 to pass therethrough.

The outer electrode 40 consists of a large-diameter cylindrical section 42 and a small-diameter cylindrical section 43 which are joined together in a continuous manner. The large-diameter cylindrical section 42 has the plurality of downward protrusions 41, and an engagement hole 44 which is formed in its side wall. The upper surface of the small-diameter cylindrical section 43 is formed as a cover 45, and the small diameter cylindrical section's side wall has a plurality of smoke inlet windows 46.

Figure 5:
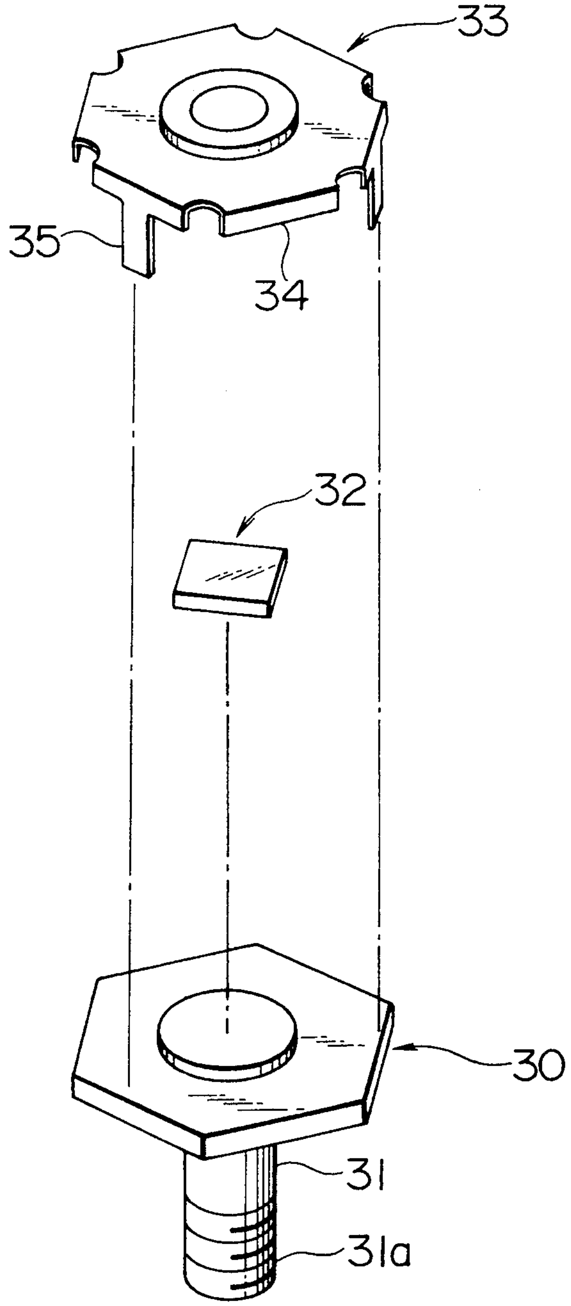
FIG. 5 is an exploded view of showing the inner electrode shown in FIG. 4.
Figure 6:
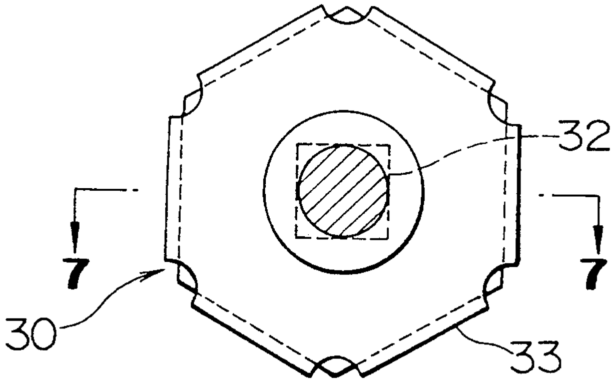
FIG. 6 is a plan view of the inner electrode shown in FIG. 5.
Figure 7:
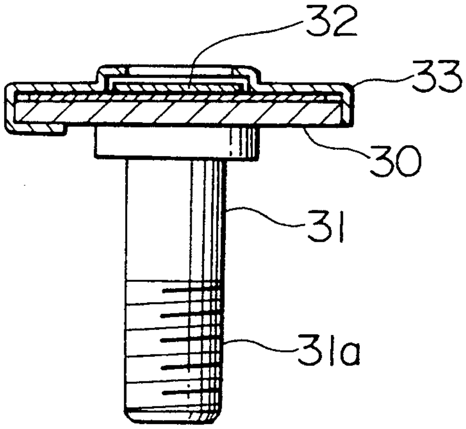
FIG. 7 is a sectional view of the inner electrode taken along a line 7—7 of FIG. 6.

As shown in FIG. 5, the inner electrode 30 has a polygonal, for example, a hexagonal, configuration, and has a leg 31 provided on the lower surface thereof. The leg 31 has a threaded portion 31*a* at its tip. Placed at the center of the upper surface of the inner electrode 30 is a square radioactive source 32 which consists, for example, of an americium 214 radioactive source. The radiation source 32 is covered with ,a radioactive-source protecting cover 33, which is positioned relative to the inner electrode 30 by guide sections 34 formed at the edges of the cover. Further, the cover 33 has a plurality of bends 35, which are bent inwardly, to thereby fasten the cover 33 to the inner electrode 30, whereby the cover secures the radioactive source 32 in position on the inner electrode 30. FIGS. 6 and 7 are a plan view and a sectional view of the inner electrode 30 to which the radioactive source 32 has thus been fastened.

The protrusions 21 of the electrode mount 20 are fitted into the insertion holes 18 of the printed circuit board 10 and temporarily fastened thereto (FIG. 4). Thus, the protrusions 21 enable the electrode mount 20 to be correctly positioned on the electrode-mount installing section 13 of the printed circuit board 10. The leg 31 of the inner electrode 30, to which the radioactive source 32 is mounted, is inserted into the insertion hole 24 of the electrode mount 20. Further, the leg 31 is passed through a through-hole formed at the center of the printed circuit board 10 to be fastened by a nut 36. Due to the polygonal configuration of the inner electrode 30, the above fastening is easy to perform. The intermediate electrode 90 is placed on the electrode mount 20, and the connection terminal 28 is held in the spring hole 92, thereby facilitating an electrical connection between the intermediate electrode 90 and the printed circuit board 10. Further, the protrusion 29 is inserted into the insertion hole 93 to position the intermediate electrode 90. Then, the screws 94 are threadedly engaged to the electrode mount 20 within the mounting holes 25, thereby securing the intermediate electrode 90 in position.

The outer electrode 40 is placed on the printed circuit board 10 in such a way as to cover the intermediate electrode 90. Then, the protrusions 41 of the outer electrode 40 are inserted into the insertion holes 19 of the printed circuit board 10 to thereby temporarily fasten the outer electrode 40 to the printed circuit board 10. After that, the outer electrode 40 is fixed by soldering.

Figure 8:
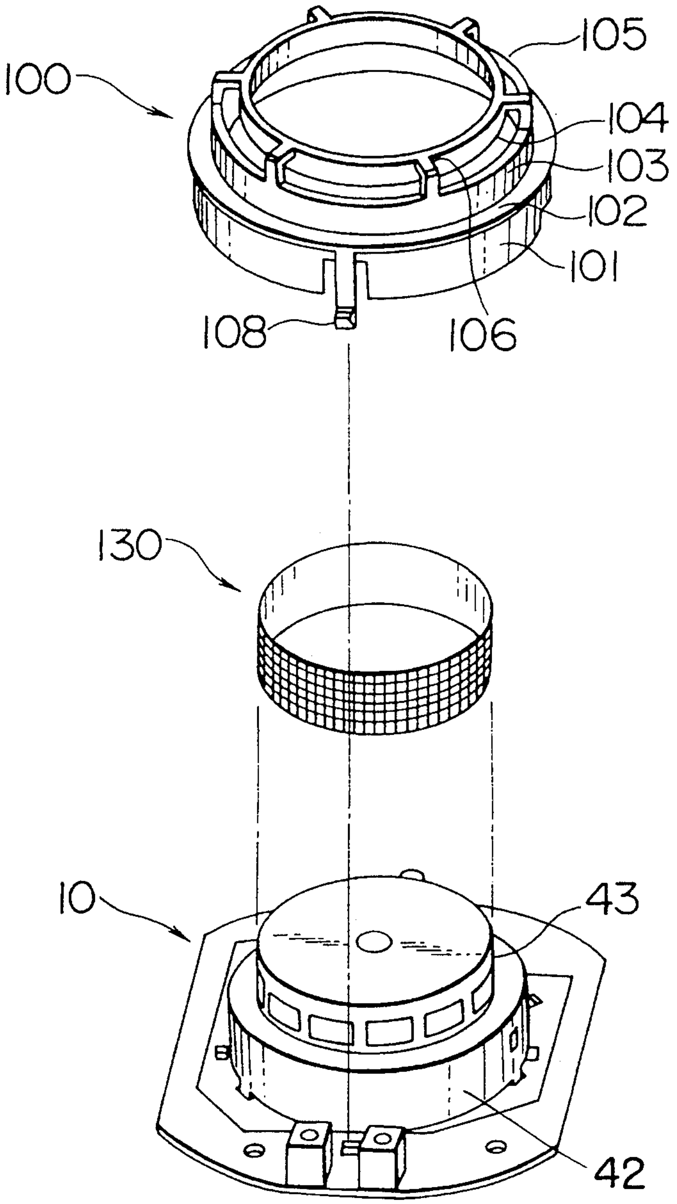
FIG. 8 is an exploded view of the smoke detector showing the printed circuit board, the bug screen and the wind shield ring thereof.

Next, as shown in FIG. 8, the bug screen 130 is arranged around the small-diameter cylindrical section 43 of the outer electrode 40. Then, the wind shield ring 100 is fastened to the printed circuit board 10 in such a Way as to cover the outer electrode 40.

The wind shield ring 100 serves to adjust the speed at which air flows into an outer ionization chamber and is in the form of a cylindrical member composed of a large-diameter cylindrical section 101, an annular step section 102, and a small-diameter cylindrical section 103. The large-diameter cylindrical section 101 has a diameter slightly larger than that of the large-diameter cylindrical section 42 of the outer electrode 40. This large-diameter cylindrical section 101 is formed in such a way as to surround the periphery of the large-diameter cylindrical section 42 and has the hooks 108 formed in its side section. The small-diameter cylindrical section 103 has a diameter larger than that of the small-diameter cylindrical section 43 of the outer electrode 40, and has an airflow speed reduction mechanism provided in its upper section surrounding the periphery of the small-diameter cylindrical section 43. The airflow speed reduction mechanism consists of a reduced-diameter section 105 whose diameter is slightly larger than that of the small-diameter cylindrical section 43 of the outer electrode 40. This reduced-diameter section 105 is supported by a plurality of struts 106 protruding inwardly from the top of the small-diameter cylindrical section 103. The annular step section 102, which joins the small-diameter cylindrical section 103 with the large-diameter cylindrical section 101, is formed in such a way that its inner wall is substantially in contact with the step section of the cylindrical body of the outer electrode 40 and its outer wall is substantially in contact with the inner surface of the protective cover 120.

The hooks 108 of the wind shield ring 100 are inserted into the insertion holes 17 of the printed circuit board 10, and the tips of the hooks 108 engage with the lower surface of the printed circuit board 10, thereby fastening the wind shield ring 100 to the printed circuit board 10. Thus, the wind shield ring 100 is easily fastened to the printed circuit board 10 in such a way as to be free from looseness and easily detachable.

Figure 9:
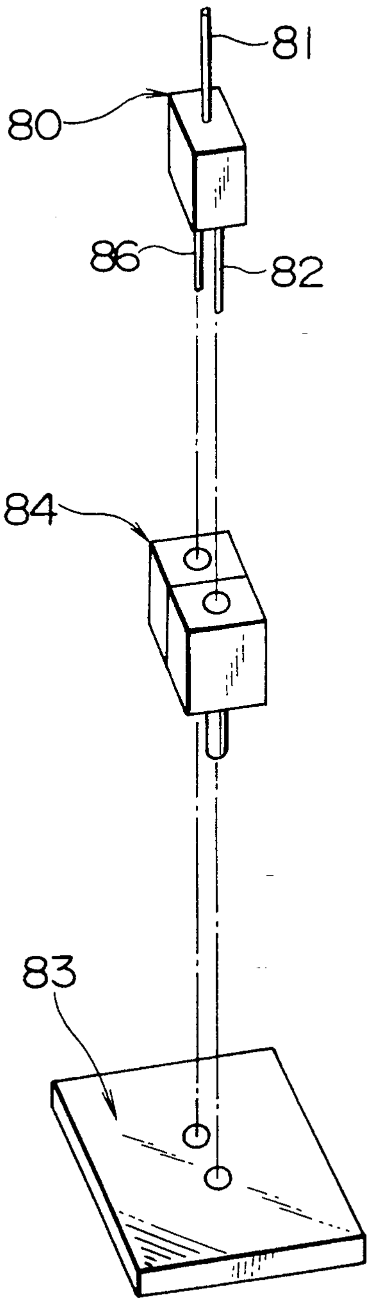
FIG. 9 is an exploded view of a portion of the smoke detector showing an FET, a second socket, etc. thereof.
Figure 10:
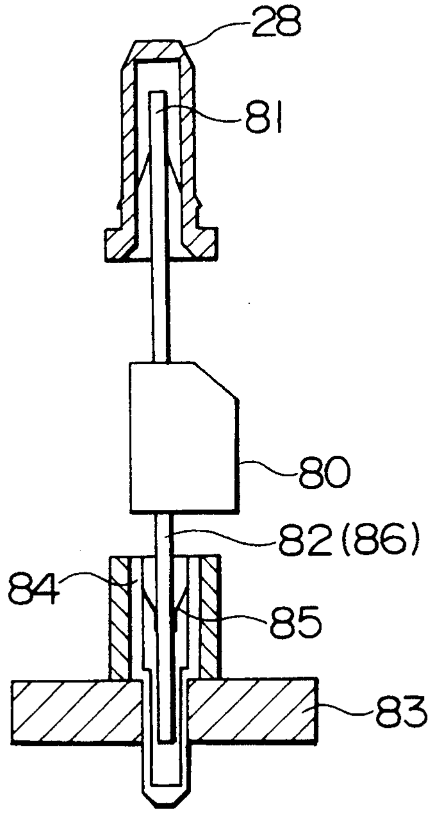
FIG. 10 is a sectional view of the portion of the smoke detector of FIG. 9 showing the way the FET is mounted.

Next, as shown in FIG. 4, the FET 80 is inserted into a mounting hole formed in the printed circuit board 10 from the lower surface of the board 10, and is fastened thereto. Prior to this fastening, the following arrangement is made: as shown in FIG. 9, a second socket 84 is fastened to a printed-circuit-board piece 83, and then the drain electrode 82 and the source electrode 86 of the FET 80 are inserted into this second socket 84. In this condition, the FET 80 is inserted into the associated mounting hole of the printed circuit board 10. In this process, the gate electrode 81 of the FET 80 is inserted into the first socket formed inside the connection terminal 28 of the electrode mount 20. Further, the printed-circuit-board piece 83 is soldered to the lower surface of the printed circuit board 10. The condition of the FET 80 at this stage is shown in FIG. 10. The drain electrode 82 and the source electrode 86 of the FET 80 are held between clip springs 85 provided inside the second socket 84.

In this way, the FET 80 is secured in position by using the first and second sockets, so that the mounting and replacement of the FET is facilitated. Further, since the FET 80 is covered with the electrode mount 20 and the printed circuit boards 10 and 83, there is no fear of reduction in insulation due to contamination of electrical parts by dust or the like from the outside. It also ensures that the required shielding is reliably achieved.

Figure 11:
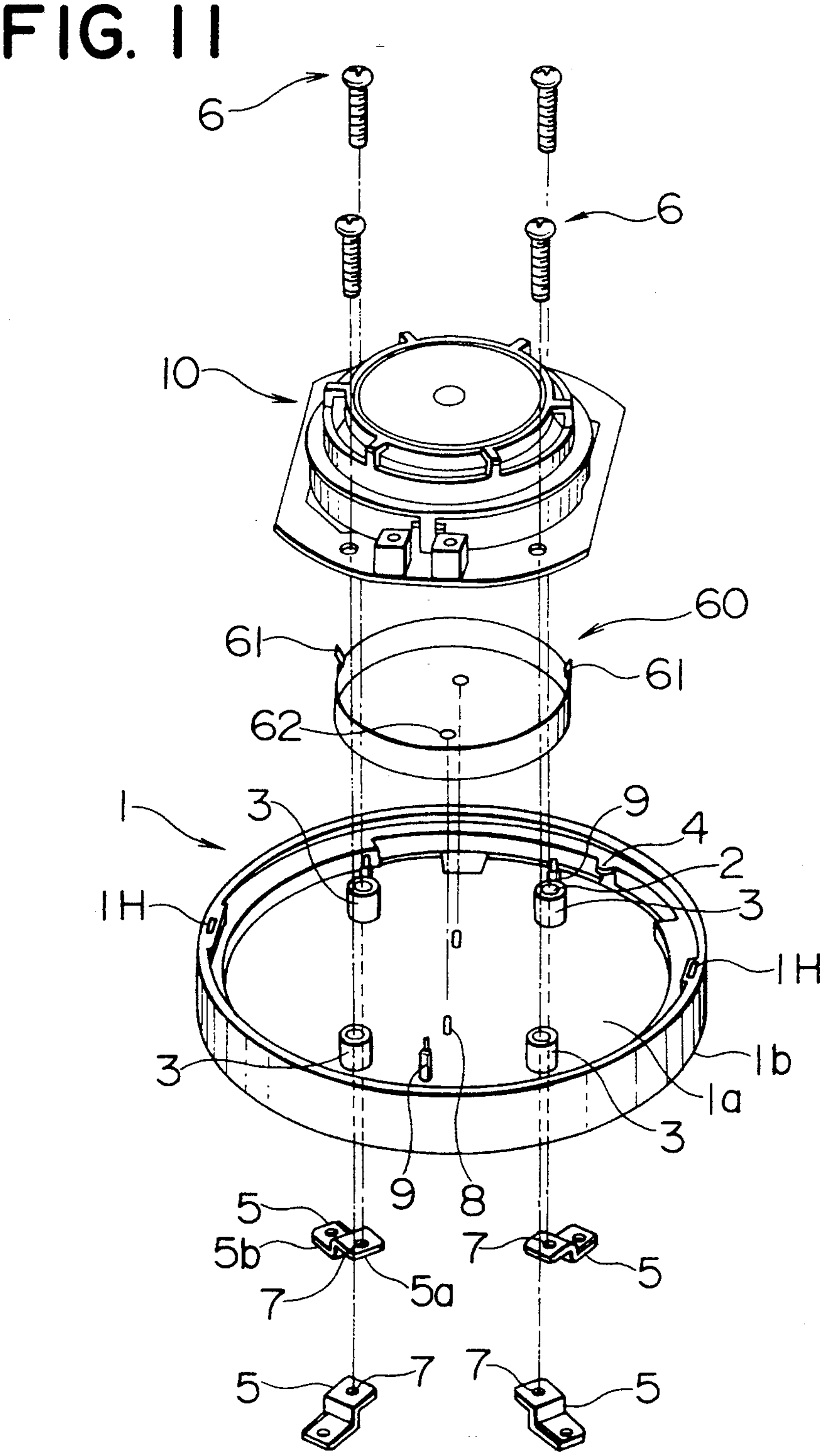
FIG. 11 is another exploded view showing the detector body, the shield case, the printed circuit board, etc. of the smoke detector.

Next, as shown in FIG. 11, the shield case 60, the printed circuit board 10, and the plurality of blade metal members 5 are mounted on the detector body 1.

Provided on the upper surface la of the detector body 1 are support columns 3 having insertion holes 2, protrusions 8 to be engaged with the shield case 60, and projecting columns 9 for positioning the printed circuit board 10. Engagement sections 4 are provided in the periphery of the detector body 1. As shown in FIG. 2, formed on the lower surface 1*b* of the detector body 1 are annular draining grooves 1R, which communicate with draining holes 1H formed in the periphery of the detector body 1. Each blade metal member 5 is composed of a fastening section 5*a* and a blade section 5*b*. The fastening section 5*a* has a threaded hole 7 to receive a terminal screw 6. The blade section 5*b* is engaged with a blade-rest member (not shown), which is a conductive connection member of a detector base.

After inserting the protrusions 8 through the insertion holes 62 of the shield case 60 and thus placing the shield case on the upper surface of the detector body 1, the printed circuit board 10 is placed on the support columns 3 while passing the engagement sections 61 of the shield case 60 through the insertion holes 15 of the printed circuit board 10. In this process, the tips of the projecting columns 9 are inserted through predetermined associated holes, thereby correctly positioning the printed circuit board 10. While the fastening sections 5*a* of the blade metal members 5 are butted against the lower surface of the detector body 1, the terminal screws 6 are inserted into the insertion holes 2 of the support columns 3 and turned therein to be threadedly engaged with the members 5 within the threaded holes 7. As a result, the printed circuit board 10 and the blade metal members 5 are simultaneously fastened to the detector body 1.

Figure 12:
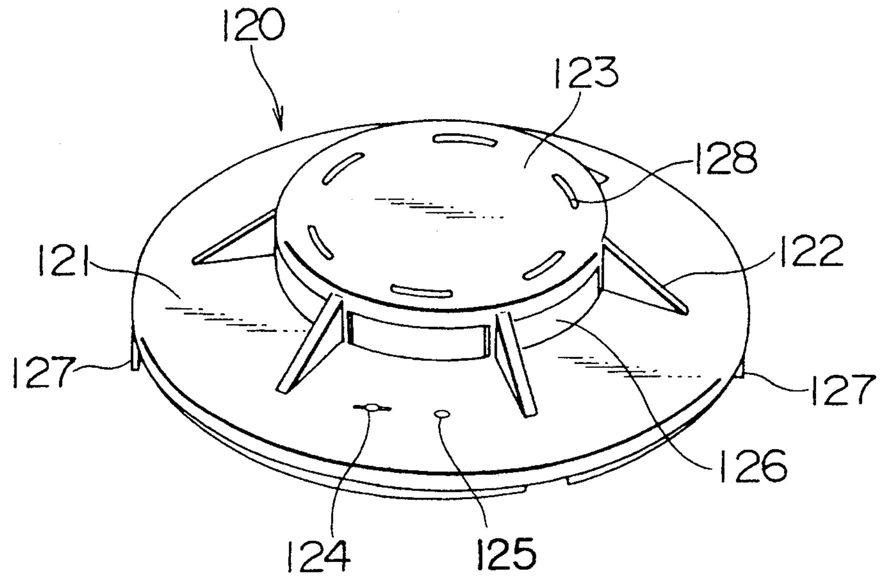
FIG. 12 is a perspective view of the protective cover of the smoke detector.

The protective cover 120, shown in FIG. 12 or FIG. 1, is placed on the detector body 1 and fastened thereto.

The protective cover 120 has a flange 121 which is joined to a top plate 123 through struts 122. Formed in the flange 121 are a check-bar insertion hole 124 and an indicator-lamp hole 125. A plurality of smoke inlet windows 126 are provided between the flange 121 and the top plate 123. Provided in the periphery of the protective cover 120 are hooks 127, which are engaged with the engagement sections 4 of the detector body 1. Further, provided in the top plate 123 are a plurality of smoke inlet windows 128, which are not absolutely necessary. The check-bar insertion hole 124 may be eliminated.

The protective cover 120 is secured in position by engaging the hooks 127 with the engagement sections 4 of the detector body 1. In this process, the indicator lamp 14, provided on the printed circuit board 10, is inserted into the indicator-lamp hole 125.

In this detector, constructed as described above, fastening by using screws is only required in the following three cases: the simultaneous attachment of the printed circuit board 10 and the blade metal members 5 to the detector body 1; the mounting of the intermediate electrode 90 to the electrode mount 20; and the attachment of the electrode mount 20 to the printed circuit board 10. Accordingly, a comparatively small number of screws can be used, thereby substantially facilitating the assembling and disassembling. Further, all of the components are attached to the printed circuit board 10 except for the protective cover 120, the blade metal members 5 and the shield case 60, and the printed circuit board 10 can be incorporated into the detector body 1 after the attachment of the components to the printed circuit board, so that the functions of the detector can be tested before incorporating the printed circuit board 10 into the detector body 1 and, further, unit replacement at the time of failure is facilitated.

What is claimed is:

1. An ionization type smoke detector comprising:

a detector body;

a printed circuit board which is arranged on an upper surface of said detector body and which has first, second and third insertion holes;

conductive connection metal members arranged on a lower surface of said detector body;

terminal screws for simultaneously attaching said printed circuit board and said conductive connection metal members to the detector body;

an electrode mount arranged on an upper surface of said printed circuit board;

an inner electrode which secures said electrode mount onto said printed circuit board and which has a radioactive source;

an intermediate electrode which is screwed onto said electrode mount in such a way as to be situated above said inner electrode;

an outer electrode which covers said electrode mount, said inner electrode and said intermediate electrode, which has a plurality of smoke inlet windows, and which is fastened to the upper surface of said printed circuit board by inserting engagement members formed at the lower end thereof into the first insertion holes of said printed circuit board;

a wind shield ring which surrounds said outer electrode, which controls the speed at which air flows into said smoke inlet windows, and which is fastened to the upper surface of said printed circuit board by inserting hooks formed at the lower end thereof into the second insertion holes of said printed circuit board;

a bug screen placed between said outer electrode and said wind shield ring;

a shield case which abuts against a lower surface of said printed circuit board and which is fastened to the lower surface of said printed circuit board and electrically connected to said outer electrode by inserting engagement sections formed at the upper end thereof into the third insertion holes of said printed circuit board; and a protective cover which covers said printed circuit board, said outer electrode and said wind shield ring, which has a plurality of smoke inlet windows, and which is fastened to the upper surface of said detector body by engaging hooks formed at the lower end thereof with said detector body.

2. A detector according to claim 1 wherein each of said conductive connection members is a blade metal member composed of a fastening section to be fastened to said detector body by one of said terminal screws and a blade section joined to said fastening section.

3. A detector according to claim 1 wherein said inner electrode includes a radioactive source installing section for installing a radioactive source, and a leg section joined to said radioactive source installing section and having a threaded portion on the peripheral surface at its tip, the leg section being passed through fourth insertion holes formed in said electrode mount and through said printed circuit board to be threadedly fastened on the lower surface of said printed circuit board.

4. A detector according to claim 3 wherein said radiation source installing section has a polygonal configuration.

5. A detector according to claim 1 wherein said printed circuit board has a check terminal for checking a circuit formed thereon.

6. A detector according to claim 5 wherein said protective cover has an insertion hole which is formed at a position corresponding to the check terminal of said printed circuit board, whereby a check bar is insertable through the insertion hole so as to effect a connection to said check terminal.

7. A detector according to claim 1 wherein said printed circuit board is fastened to said detector body by means of said terminal screws at positions on the outside of said wind shield ring.

8. An ionization type smoke detector comprising:

an electrode mount which has on its upper surface an inner electrode accommodating section having an insertion hole at the center thereof, said electrode mount further having on its lower surface a plurality of protrusions for temporary fastening;

an intermediate electrode fastened to the upper section of said electrode mount and having at its center a radiation transmission hole;

a printed circuit board having a first insertion hole formed at a position corresponding to the insertion hole of said electrode mount and a plurality of second insertion holes through which the plurality of protrusions of said electrode mount are inserted., respectively;

an inner electrode having a polygonal radioactive-source installing section and a leg section joined to said radioactive-source installing section, said leg section having a threaded portion at a free end thereof, said radioactive-source installing section being accommodated in said inner electrode accommodating section of said electrode mount, the leg section passing through the insertion hole of said electrode mount and the first insertion hole of said printed circuit board;

a radioactive source disposed on an upper surface of said radioactive-source installing section;

a threaded fastener threaded to said threaded portion of the leg section of said inner electrode at the lower surface of said printed circuit board to secure said inner electrode to said printed circuit board; and an outer electrode which covers said electrode mount, said inner electrode, and the intermediate electrode and which is fastened to said printed circuit board.

9. A detector according to claim 8 wherein said electrode mount has a cylindrical wall formed in the periphery of said inner electrode accommodating section.

10. A detector according to claim 9 wherein the cylindrical wall has in its edge portion an FET accommodating section and at least one screw hole for mounting the intermediate electrode, and which FET accommodating section and at least one screw hole are circumferentially spaced apart from each other along said cylindrical wall.

11. A detector according to claim 10 wherein said FET accommodating section has an open lower end portion and an upper surface equipped with a connection terminal connected to a terminal of said FET.

12. A detector according to claim 8 wherein said printed circuit board has on its upper surface a shield section, a check terminal for checking a circuit, and an electrode mount installing section.

13. A detector according to claim 8 wherein said inner electrode has a radioactive-source protection cover for securing in position the radioactive source placed on the radioactive-source installing section.

14. An ionization type smoke detector comprising:

a printed circuit board;

an electrode mount arranged on said printed circuit board and having an FET accommodating section for accommodating an FET;

an inner electrode which is attached to said electrode mount and to which a radioactive source is fastened;

an intermediate electrode fastened to an upper section of said electrode mount;

an outer electrode which covers said electrode mount, said inner electrode and the intermediate electrode and which is fastened to said printed circuit board;

a first socket formed in the FET accommodating section of said electrode mount and electrically connected to the intermediate electrode;

a second socket formed on said printed circuit board; and an FET which is accommodated in the FET accommodating section of said electrode mount and whose electrodes formed at its ends are respectively connected to the first and second sockets.

15. A detector according to claim 14 wherein that portion of said FET accommodating section of said electrode mount which abuts on said printed circuit board is formed as an open section, which is closed by said printed circuit board.

16. A detector according to claim 14 wherein the first socket is connected to the gate electrode of said FET and the second socket is connected to the drain and source electrodes of said FET.

17. A detector according to claim 14 wherein said printed circuit board includes a first board on which various circuit parts are mounted and to which said electrode mount is attached, and a second board provided with a second socket and soldered to the first board.

18. A detector according to claim 14 wherein said printed circuit has a shield section which occupies the greater part of its surface, said FET being shielded by the shield section of said printed circuit board and said outer electrode.

19. A detector according to claim 14 further comprising a connection terminal provided on said electrode mount and having one end electrically connected to the first socket and the other end protruding upwardly beyond said electrode mount, said intermediate electrode having a spring hole for holding the other end of said connection terminal, electrical connection between the first socket and said intermediate electrode being achieved by fitting the connection terminal into the spring hole of the intermediate electrode.

20. A detector according to claim 19 wherein one end of the connection terminal extends through said electrode mount so as to face the interior of said FET accommodating section, the first socket being connected to that one end.

21. A detector according to claim 14 wherein said electrode mount has projections formed on its upper surface, said intermediate electrode having insertion holes through which the projections of said electrode mount are inserted.

22. An ionization type smoke detector comprising:

a printed circuit board having a printed circuit formed on a lower surface thereof, a plurality of first insertion holes, and a second insertion hole;

an electrode mount arranged on an upper surface of said printed circuit board;

an inner electrode which is mounted on said electrode mount and to which a radioactive source is fastened;

an intermediate electrode fastened to an upper section of said electrode mount;

an outer electrode which is fastened to the upper surface of said printed circuit board in such a way as to cover said electrode mount, said inner electrode and the intermediate electrode and which has a plurality of smoke inlet windows formed in a side wall thereof, said outer electrode having a plurality of engagement sections, which are formed at its lower end, abutting said printed circuit board and which are inserted through the first insertion holes of said printed circuit board said engagement sections being secured by solder to said printed circuit on the lower surface of said printed circuit board, and an engagement hole in its side wall; and a shield case abutting the lower surface of said printed circuit board and electrically connected to said outer electrode, the shield case having an engagement section formed on its upper end section and which is received in the insertion hole of said outer electrode in engagement with said outer electrodes, said engagement section passing through said second insertion hole of said printed circuit board.

23. An ionization type smoke detector comprising:

a printed circuit board in which a plurality of first insertion holes are formed;

an electrode mount arranged on an upper surface of said printed circuit board;

an inner electrode which is attached to said electrode mount and to which a radioactive source is fastened;

an intermediate electrode fastened to an upper section of said electrode mount;

an outer electrode which is fastened to the upper surface of said printed circuit board in such a way as to cover said electrode mount, said inner electrode and the intermediate electrode and which has a plurality of smoke inlet windows formed in a side wall thereof; and a wind shield ring which surrounds said outer electrode, which has a speed reduction mechanism for airflow through the smoke inlet windows of said outer electrode, and which is fastened to the upper surface of said printed circuit board by inserting hooks formed at the lower end thereof through the first insertion holes of said printed circuit board.

24. A detector according to claim 23 wherein said outer electrode includes a small-diameter cylindrical section whose upper end is closed and which has a plurality of smoke inlet windows formed in a side wall thereof, and a large-diameter cylindrical section which is connected to the lower end of the small-diameter cylindrical section, which has a diameter larger than that of the small-diameter cylindrical section, and which has an open lower end section abutting on the upper surface of said printed circuit board.

25. A detector according to claim 24 wherein said outer electrode has a plurality of engagement sections formed at the lower end of the large-diameter cylindrical section and is fastened to the upper surface of said printed circuit board by inserting these engagement sections into second insertion holes of said printed circuit board.

26. A detector according to claim 24 wherein said wind shield ring consists of a cylindrical member having substantially the same height as said outer electrode and a size which enables it to accommodate said outer electrode.

27. A detector according to claim 26 wherein said wind shield ring includes a large-diameter cylinder situated on the outside of the large-diameter cylindrical section of said outer electrode, a small-diameter cylinder situated on the outside of the small-diameter cylindrical section of said outer electrode, an annular step section joining the small-diameter cylinder to the large-diameter cylinder; and an airflow-speed-reduction mechanism formed on an upper section of the small-diameter cylinder.

28. A detector according to claim 27 wherein the airflow-speed-reduction mechanism includes a ring having a diameter smaller than that of the small-diameter cylinder and larger than that of the small-diameter cylindrical section of said outer electrode, and a plurality of struts formed on the upper section of the small-diameter cylinder for the purpose of supporting the ring in an upper inside section of the small-diameter cylinder.

29. A detector according to claim 27 wherein an inner wall of the annular step section is substantially in contact with the periphery of said outer electrode.

30. A detector according to claim 27 further comprising a protective cover which covers said printed circuit board, said outer electrode and said wind shield ring and which has a plurality of smoke inlet windows.

31. A detector according to claim 30 wherein an outer wall of the annular step section of said wind shield ring is substantially in contact with an inner wall of the protective cover.

32. A detector according to claim 30 further comprising a bug screen placed between the small-diameter cylindrical section of said outer electrode and the small-diameter cylinder of said wind shield ring.

* * * * *